(12) United States Patent
Pandamaneti et al.

(10) Patent No.: US 11,983,514 B2
(45) Date of Patent: May 14, 2024

(54) SYSTEMS AND METHODS FOR DATA TRANSFORMATION

(71) Applicant: Capital One Services, LLC, McLean, VA (US)

(72) Inventors: Komal Krishna Pandamaneti, Frisco, TX (US); Sriram Srinivasan, Frisco, TX (US); Lavanya Raja, Frisco, TX (US); Sairam Kommireddy, Frisco, TX (US); Maria Rabinowitz, Arlington, VA (US); Steven W. Braskamp, Dallas, TX (US); Steven G. Chiagouris, Plano, TX (US); Jason E. Lines, Prosper, TX (US); Arjun Dugal, Dallas, TX (US); Brittany Nicole Geron Courtney, Celina, TX (US)

(73) Assignee: Capital One Services, LLC, McLean, VA (US)

(*) Notice: Subject to any disclaimer, the term of this patent is extended or adjusted under 35 U.S.C. 154(b) by 90 days.

(21) Appl. No.: 17/936,510

(22) Filed: Sep. 29, 2022

(65) Prior Publication Data

US 2024/0111503 A1    Apr. 4, 2024

(51) Int. Cl.
G06F 9/44    (2018.01)
G06F 8/35    (2018.01)
G06F 8/71    (2018.01)

(52) U.S. Cl.
CPC . *G06F 8/35* (2013.01); *G06F 8/71* (2013.01)

(58) Field of Classification Search
None
See application file for complete search history.

(56) References Cited

U.S. PATENT DOCUMENTS

| 8,204,809 | B1* | 6/2012 | Wise | G06Q 40/06 |
| | | | | 705/36 R |
| 8,571,974 | B1* | 10/2013 | Coleman | G06Q 40/03 |
| | | | | 705/37 |
| 2007/0208574 | A1* | 9/2007 | Zheng | G06Q 10/10 |
| | | | | 705/1.1 |
| 2013/0173596 | A1* | 7/2013 | Roediger | G06Q 10/08 |
| | | | | 707/722 |
| 2014/0013337 | A1* | 1/2014 | Neft | G06F 8/71 |
| | | | | 719/314 |
| 2021/0392080 | A1* | 12/2021 | Shen | H04L 47/22 |
| 2023/0266970 | A1* | 8/2023 | Aiyer | G06F 8/447 |
| | | | | 717/120 |

\* cited by examiner

*Primary Examiner* — Qamrun Nahar
(74) *Attorney, Agent, or Firm* — Perkins Coie LLP

(57) ABSTRACT

Systems and methods for transforming data for a batch-based legacy software program into data suitable for processing by a streaming-based new software program. In some aspects, the system generates an information stream for multiple threads from batch information received from the legacy software program. The system processes the information stream for the multiple threads using the new software program. If there is a mismatch between outputs of the legacy and new software programs for at least one thread, the system adjusts a data model of the new software program to address the mismatch and generates an updated information stream for processing by the new software program.

15 Claims, 7 Drawing Sheets

600

---

Receive information for a plurality of threads to be processed by a new software program, the information including for each thread static data captured from a legacy software program at a particular time associated with the thread — 602

Process, using the new software program, the static data for each thread of the plurality of threads to generate corresponding dynamic data during a time period subsequent to the particular time associated with the thread — 604

Compare, for each thread of the plurality of threads, the dynamic data from the new software program and corresponding dynamic data during the time period from the legacy software program — 606

Based on the comparison, determine that at least one thread has a mismatch between the dynamic data from the new software program and corresponding dynamic data from the legacy software program — 608

Generate metadata for the at least one thread to supplement static data for the at least one thread captured from the legacy software program — 610

Process, using the new software program, the supplemented static data for the at least one thread to generate updated dynamic data during the time period subsequent to the particular time associated with the at least one thread — 612

FIG. 6

SYSTEMS AND METHODS FOR DATA TRANSFORMATION

BACKGROUND

Many institutions such as government agencies, transportation authorities, and financial institutions operate today using large systems that rely on code developed years or decades ago. While some institutions are making efforts to replace the old code with code written in newer, easier to navigate programming languages, this is not a straightforward or simple transition. For example, some companies are making efforts to replace code still in use in their systems today that was written in Common Business Oriented Language (COBOL), a programming language developed in the late 1950s. However, it can take months or years to replace a program that relies on code written in COBOL as it is a time-consuming and costly task that requires expert programmers to manually navigate and update the old code in the system.

SUMMARY

Systems and methods are described herein for facilitating replacement of a legacy software program with a new software program. For example, the legacy software program may have been written in an older programming language, such as COBOL, while the new software program may be written in a newer easier to navigate programming language, such as PYTHON or JAVA. When preparing to replace part or all of a legacy software program with a new software program, a user (e.g., a programmer or another suitable user) may not be able to observe and compare the logic of the legacy software program with the logic of the new software program in a comprehensive manner in order to ensure parity. For example, each software program may contain hundreds or thousands of lines of code, and the user may not be able to manually compare the logic of both in a comprehensive manner in order to ensure parity. Further, when preparing to replace the legacy software program with the new software program, input data being received from upstream processes by the legacy software program may be in a format different from a format suitable for processing by the new software program. Similarly, output data being provided to downstream processes by the legacy software program may be in a format different from output data generated by the new software program. Still further, when preparing to replace the legacy software program with the new software program, the user may find migrating data from the legacy software program in operation for years or decades to be a yet another time-consuming and costly task.

In some embodiments, to address one or more of the technical problems described above, systems and methods are described herein for determining software parity between a new software program and a legacy software program. When replacing a legacy software program with a new software program, both software programs may be run in parallel and outputs from multiple threads running across both software programs may be compared over a period of time to examine whether the outputs are consistent across both software programs. Conventionally, if an error is detected in one of the outputs from even a single thread, the new software program is stopped. The new software program is resumed only after the error is addressed, thereby requiring the new software program to be executed with past input data that was missed as the legacy software program continued to execute on the input data. This can lead to lost time and efficiency which may be crucial in order to deploy the new software program and establish the new software program as a system of record to replace the legacy software program.

The described systems and methods for determining that a new software program is in parity with a legacy software program improve upon conventional systems described above. In particular, the system receives information for multiple threads processed by a legacy software program. The system processes the information using the new software program, which is being executed in parallel with the legacy software program. If an output of a particular thread from the new software program varies outside a threshold distance from a corresponding output for the thread from the legacy software program, the system ceases further processing of the particular thread by the new software program. Otherwise, the system allows processing of the particular thread by the new software program to continue. In this way, only threads with errors are stopped while the remaining threads continue to execute uninterrupted, thereby helping the new software program obtain parity with the legacy software program in a timely and cost-efficient manner.

In some embodiments, the system receives, in chronological order, information for a plurality of threads processed by a legacy software program. The information includes input data and corresponding output data for each thread. The system processes, using a new software program executing in parallel with the legacy software program, for a first thread from the plurality of threads, first input from the input data to generate a first output. The system determines whether a variance of the first output falls within a threshold distance from a corresponding value in the output data for the first thread generated from the legacy software program. The system, in response to determining that the variance of the first output does not fall within the threshold distance from the corresponding value in the output data for the first thread, ceases further processing by the new software program of the input data for the first thread.

The system processes, using the new software program executing in parallel with the legacy software program, for a second thread from the plurality of threads, a second input from the input data to generate a second output. Processing for the second thread at least partially overlaps with processing for the first thread. The system determines whether a variance of the second output falls within the threshold distance from a corresponding value in the output data for the second thread generated from the legacy software program. The system, in response to determining that the variance of the second output falls within the threshold distance from the corresponding value in the output data for the second thread, allows further processing by the new software program of the input data for the second thread.

In some embodiments, to address one or more of the technical problems described above, systems and methods are described herein for transforming data between a new software program and a legacy software program. Conventionally, because the inputs and outputs from a legacy software program may impact other software programs that provide to, or receive data from, the legacy software program, any updates to the legacy software program may also require updates to the surrounding upstream and downstream software programs. For example, if the legacy software program is batch-based and the new software program is streaming-based, in conventional systems the surrounding batch-based software programs may have to be adapted accordingly in order to interface with the streaming-based new software program.

The described systems and methods transform data for a batch-based legacy software program into data for processing by a streaming-based new software program. For example, the described systems and methods may establish input and output abstraction layers to transform data for the batch-based legacy software program into data suitable for processing by the streaming-based new software program. In particular, the system generates an information stream for multiple threads from batch information received from the legacy software program. The system processes the information stream for the multiple threads using the new software program. If there is a mismatch between outputs of the legacy and new software programs for at least one thread, the system adjusts a data model of the new software program to address the mismatch and generates an updated information stream for processing by the new software program. For example, while the legacy software program may be based on a batch-based data model, the new software program may be based on a streaming-based model. In some embodiments, updating the data model of the new software program may include updating an input abstraction layer or an output abstraction layer tasked with transforming data based on a batch-based data model into data suitable for a streaming-based data model. In this way, the data may be transformed for the new software program without need for modifying any upstream or downstream software programs before establishing an interface to the new software program.

In some embodiments, the system receives batch information for a plurality of threads to be processed by a new software program. The batch information includes for each thread input data and output data captured from a legacy software program during a particular time period. The system generates, from the batch information, an information stream based on a data model for the new software program. The information stream includes at least some of the input data for the plurality of threads. The data model (e.g., a batch-based data model) for the new software program is different from a data model (e.g., a streaming-based data model) for the legacy software program. The system processes, using the new software program, the information stream for the plurality of threads to generate corresponding output data for the particular time period.

The system compares the output data from the new software program and the output data from the legacy software program for the particular time period. The system, based on the comparison, determines that at least one thread has a mismatch between the output data from the new software program and the output data from the legacy software program. The system adjusts the data model for the new software program based on the mismatch for the at least one thread. The system generates, from the batch information, an updated information stream based on the adjusted data model for the new software program. The system processes, using the new software program, the updated information stream for the plurality of threads to generate corresponding output data for the particular time period.

In some embodiments, to address one or more of the technical problems described above, systems and methods are described herein for migrating data between a new software program and a legacy software program. Conventionally, a task for replacing a legacy software program with a new software program may require providing all possible data input to, and output from, the legacy software program. However, this may not be feasible for a legacy software program that has been in operation for a long period of time. For example, if a legacy software program has been executing for several years or decades, it may not be possible to migrate all possible data provided to, and generated from, the legacy software program.

The described systems and methods migrate data from a legacy software program to a new software program in a manner that improves upon conventional systems described above. In particular, the system captures a snapshot of the current state of static data for multiple threads from the legacy software program. The system processes the static data for the multiple threads using the new software program to generate dynamic data for a period of time. During the same period of time, the legacy software program also produces dynamic data for the multiple threads. If there is a mismatch between dynamic data from the new and legacy software programs for at least one thread, the system generates metadata for the at least one thread to supplement static data for the at least one thread for processing by the new software program. In this way, it is possible to migrate data from the legacy software program to the new software program even if the legacy software program has been executing for a long period of time.

In some embodiments, the system receives information for a plurality of threads to be processed by a new software program. The information includes for each thread static data captured from a legacy software program at a particular time associated with the thread. The system processes, using the new software program, the static data for each thread of the plurality of threads to generate corresponding dynamic data during a time period subsequent to the particular time associated with the thread. The system compares, for each thread of the plurality of threads, the dynamic data from the new software program and corresponding dynamic data during the time period from the legacy software program.

The system, based on the comparison, determines that at least one thread has a mismatch between the dynamic data from the new software program and corresponding dynamic data from the legacy software program. The system generates metadata for the at least one thread to supplement static data for the at least one thread captured from the legacy software program. The system processes, using the new software program, the supplemented static data for the at least one thread to generate updated dynamic data during the time period subsequent to the particular time associated with the at least one thread.

In some embodiments, to address one or more of the technical problems described above, systems and methods are described herein for analyzing performance for different termination time periods for a software program executing one or more threads. For example, if an exception occurs for a particular thread of the software program, depending on the selected termination time period for the software program, the overall performance of the software program may be better. Conventional software programs may not have information necessary to make an intelligent selection between different options for a termination time period for handling an exception.

The described systems and methods determine a difference in performance for a software program processing input data for multiple threads based on different termination time periods for handling an exception. In particular, the system receives input data and corresponding performance data for multiple threads with respect to a first termination time period for terminating the thread when an exception is detected. The system processes the input data to generate corresponding performance data for the multiple threads with respect to a second termination time period for terminating the thread when the exception is detected. The system determines a difference in performance for a particular thread based on performance data with respect to the first termination time period and corresponding performance data with respect to the second termination time period. In this way, the system can leverage past information to help choose between different options for the termination time period for future threads to be executed by the software program.

In some embodiments, the system receives information for a plurality of threads processed by a software program. The information includes input data for each thread and corresponding performance data with respect to a first termination time period for terminating the thread when an exception is detected. The system processes, using the software program, the input data for each thread to generate corresponding performance data with respect to a second termination time period for terminating the thread when the exception is detected. The processing includes extracting, for a first thread from the plurality of threads, first input from the input data and processing, using the software program, for the first thread, the first input to generate performance data with respect to the second termination time period. The system determines a performance difference for the plurality of threads processed by the software program with respect to the first and second termination time periods. The determining includes extracting, for the first thread, performance data with respect to the first termination time period and determining a performance difference for the first thread based on the performance data with respect to the first termination time period and the performance data with respect to the second termination time period. The system, based on the performance difference, selects the first termination time period or the second termination time period for a future thread processed by the software program.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 6 shows a flowchart of the steps involved in migrating data from a legacy software program to a new software program, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
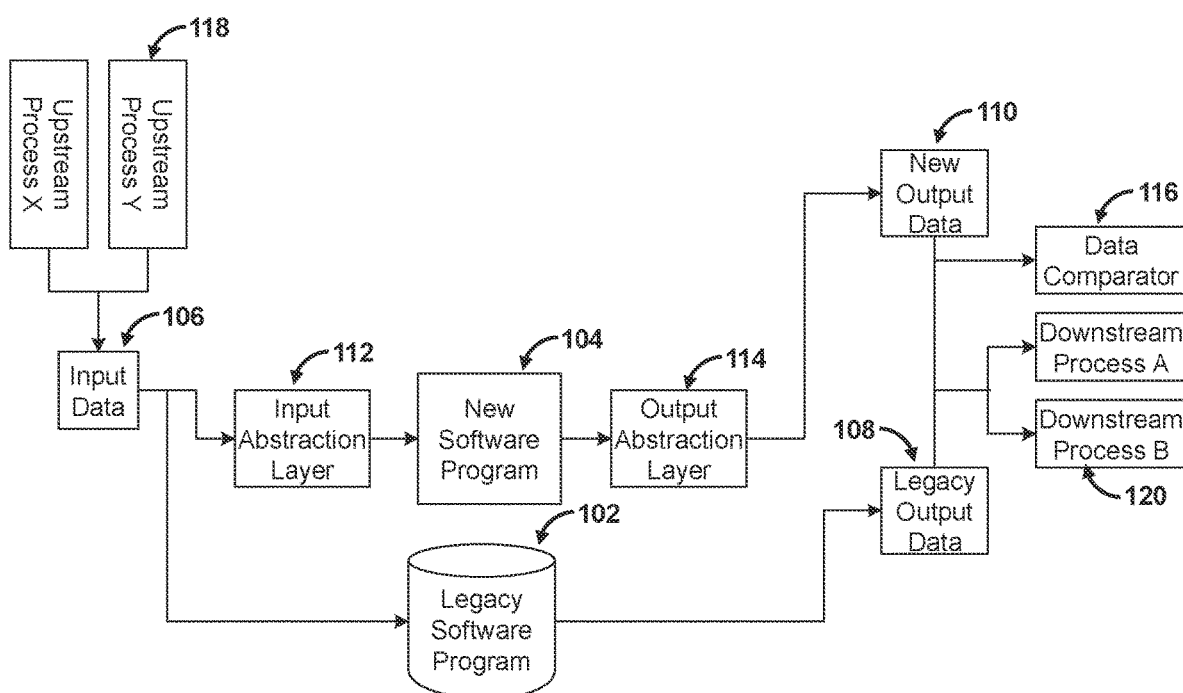
FIG. 1 shows an illustrative system for facilitating replacement of a legacy software program with a new software program, in accordance with one or more embodiments.

FIG. 1 shows an illustrative system 100 for facilitating replacement of a legacy software program 102 with a new software program 104, in accordance with one or more embodiments. When preparing to replace part or all of the legacy software program 102 with the new software program 104, a user (e.g., a programmer or another suitable user) may not be able to observe and compare the logic of the legacy software program 102 with the logic of the new software program 104 in a comprehensive manner to ensure parity. For example, the respective software programs may contain hundreds or thousands of lines of code, and the user may not be to manually compare the logic of both in a comprehensive manner to ensure parity.

The system may receive input data 106 for processing by the legacy software program 102 and the new software program 104. For example, input data 106 may include, in chronological order, input data for a plurality of threads (e.g., where each thread is related to an auto loan) processed or to be processed by the legacy software program 102. The system may also receive legacy output data 108 corresponding to the input data for each thread of the plurality of threads processed by the legacy software program 102. While the new software program 104 is executing in parallel with the legacy software program 102, for a first thread (e.g., related to a first auto loan) from the plurality of threads, the system may process a first input from the input data 106 to generate a first output for the new output data 110 from the new software program 104. The system may determine using a data comparator 116 whether a variance of the first output from the new software program 104 falls within a threshold distance from a corresponding value in the output data for the first thread from the legacy software program 102. If the variance of the first output from the new output data 110 does not fall within the threshold distance from the corresponding value in the output data from the legacy output data 108, the system may cease further processing by the new software program 104 of the input data for the first thread. In this way, only threads with errors are stopped while the remaining threads may continue to execute uninterrupted as described below, thereby helping the new software program obtain parity with the legacy software program in a timely and cost-efficient manner. The user may manually or automatically address the error in the first thread while other threads continue to be processed by the new software program 104 and analyzed for parity with the legacy software program 102.

For a second thread (e.g., related to a second auto loan) from the plurality of threads, the system may process a second input from the input data 106 to generate a second output for the new output data 110 from the new software program 104. Generally, the second thread may continue to be processed while at least partially overlapping with processing for the first thread until it is stopped, though this is not a requirement for the systems and methods described herein. The system may determine using the data comparator 116 whether a variance of the second output from the new software program 104 falls within the threshold distance from a corresponding value in the output data for the second thread from the legacy software program 102. If the variance of the second output from the new output data 110 falls within the threshold distance from the corresponding value in the output data from the legacy output data 108, the system may allow further processing by the new software program 104 of the input data for the second thread.

In some embodiments, the legacy software program may be implemented at a business and may need to be replaced with the new software program as the system of record for applications for the business, such as applications related to banking, credit cards, auto loans, home loans, or other suitable applications. Using the described systems and methods, a user may evaluate whether there is parity between processing of business capabilities in both the legacy and new software programs with different data sets. The user may confirm the parity of both software programs by sophisticated data comparison and insightful reporting. For example, the user may replay servicing events historically and compare results to ensure that the new servicing core behavior is accurate. The user may have the ability to test over a defined and flexible period of time without the need for time to pass organically (e.g., several days, months, etc.). This may enable the business to compare both legacy as well as modern platforms for parity before the new software program is cut over as the system of record. The described techniques may be used in conjunction with other testing strategies to enable the new software program to be established as the system of record.

Further, when preparing to replace the legacy software program 102 with the new software program 104, the input data 106 may be received from upstream processes 118 for the legacy software program 102 but may be in a format different from a format suitable for processing by the new software program 104. Similarly, the legacy output data 108 provided to downstream processes 120 by the legacy software program 102 may be in a format different from the new output data 110 generated by the new software program 104.

For example, the input data 106 received by the system may include batch information for a plurality of threads to be processed by the legacy software program 102. The batch information may include for each thread (e.g., where the thread is related to an auto loan) input data and output data captured from the legacy software program 102 during a particular time period. Because the data model for the new software program 104 is different from a data model for the legacy software program 102, using input abstraction layer 112, the system may generate, from the batch information, an information stream based on a data model for the new software program 104. The information stream may include at least some of the input data for the plurality of threads. The system may process, using the new software program 104, the information stream for the plurality of threads to generate corresponding output data for the particular time period. The system may use output abstraction layer 114 to generate batch information (for new output data 110) from the information stream for the corresponding output data from the new software program 104. In this way, the data may be transformed for the new software program without need for modifying any upstream or downstream software programs to establish an interface to the new software program.

The system may compare the new output data 110 from the new software program 104 and the legacy output data 108 from the legacy software program 102 for the particular time period. The system, based on the comparison, may determine that at least one thread has a mismatch between the new output data 110 from the new software program 104 and the legacy output data 108 from the legacy software program 102. The system may adjust the data model for the new software program 104 based on the mismatch for the at least one thread. For example, the system may adjust logic for combining multiple attributes into one attribute, logic for adapting batch-based information for an attribute into stream-based information, etc. The system may generate, from the batch information, an updated information stream based on the adjusted data model for the new software program 104. The system may process, using the new software program 104, the updated information stream for the plurality of threads to generate the new output data 110 for the particular time period.

In some embodiments, the described systems and methods address a challenge of modernizing legacy systems without impacting surrounding, upstream, or downstream applications by creating the input and output abstraction layers for handling data transformations and ingestion independently. Using the described systems and methods, the new software program may be testing for parity with the legacy software program and eventually established as the system of record without need for modifications to any upstream or downstream applications.

Figure 2:
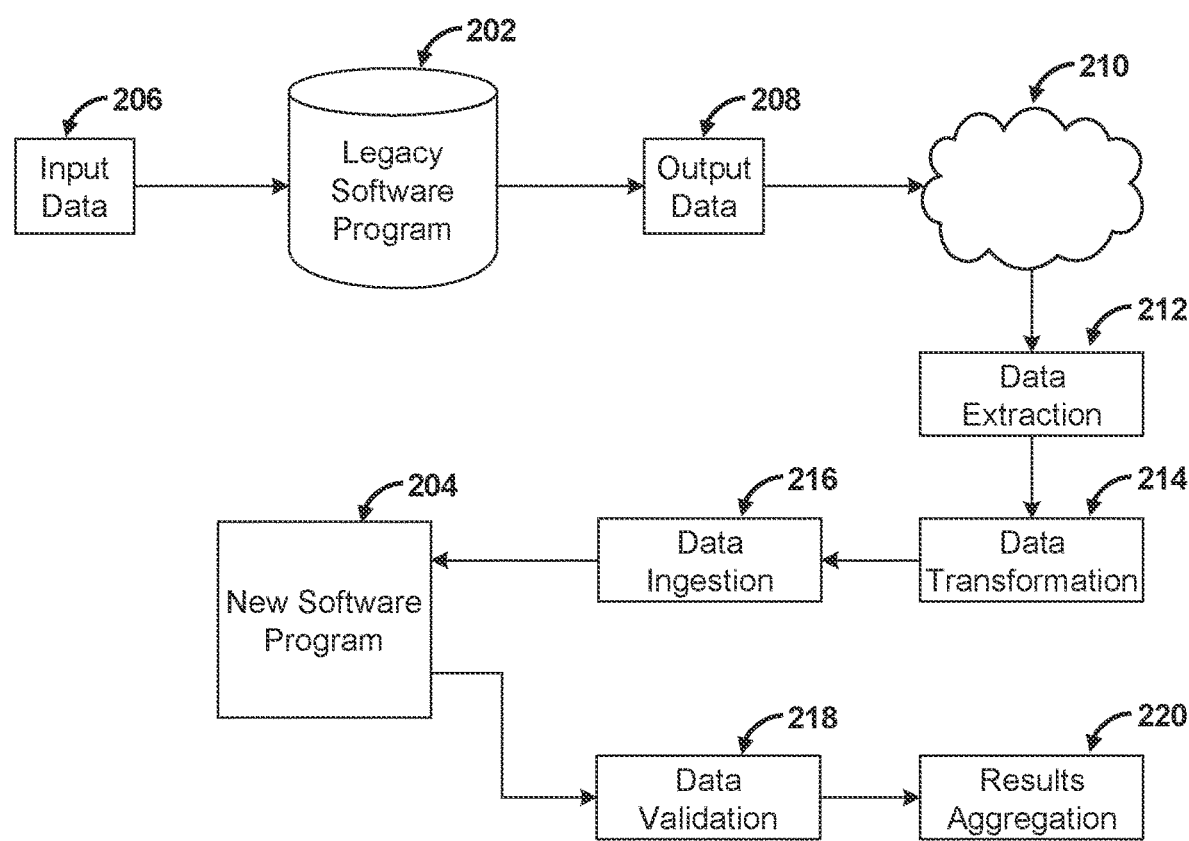
FIG. 2 shows another illustrative system for facilitating replacement of a legacy software program with a new software program, in accordance with one or more embodiments.

FIG. 2 shows an illustrative system 200 for facilitating replacement of a legacy software program 202 with a new software program 204, in accordance with one or more embodiments. When preparing to replace the legacy software program 202 with the new software program 204, the user may find migrating data from the legacy software program 202 operating for years or decades to be a time-consuming and costly task. For example, for a task for replacing a legacy software program with a new software program, providing all possible data input to and output from the legacy software program may not be feasible. If a legacy software program has been executing for a number of years or decades, it may not be possible to migrate all possible data provided to and generated from the legacy software program.

The system may receive information for a plurality of threads to be processed by the new software program 204. For example, the system may receive the information at a cloud component 210. The information may include for each thread static data captured from the legacy software program 202 at a particular time associated with the thread. For example, the information may include at least some of, or be based on, the input data 206 or the output data 208.

Subsequently, the system may process, using the new software program 204, the static data for each thread to generate corresponding dynamic data during a time period subsequent to the particular time associated with the thread. The system may compare, for each thread, the dynamic data from the new software program 204 and corresponding dynamic data during the time period from the legacy software program 202. In this way, it is possible to migrate data from the legacy software program 202 to the new software program 204 even if the legacy software program 202 has been executing for a long period of time.

At data extraction component 212, the system may extract from the received information input and output data to be processed by the new software program 204. For example, the system may generate a query for legacy structured transactional and account validation snapshot data for one or more auto loan accounts. The system may identify one or more transactions to be processed by the new software program 204. The system may map the transactions to one or more servicing commands and may map one or more data files to a servicing API. The system may extract account and transactional data and generate a corresponding information stream for the new software program 204.

At data transformation component 214, the system may transform input/output data received from the data extraction component 212 into a format suitable for processing by the new software program 204. For example, the system may transform legacy transaction data into a format suitable for processing by the new software program 204. The system may transform the transaction data to a servicing command specification, insert end-of-day markers between account transactions, and group account transactions in sequence for data ingestion.

At data ingestion component 216, the system may ingest processed input/output data received from the data transformation component 214 into the new software program 204. For example, the system may ingest account transactions and end-of-day markers between account transactions into the new software program 204. The system may optionally validate any response related to the ingestion in order to confirm the provided information is suitable for processing by the new software program 204.

At data validation component 218, the system may validate output from the new software program 204 with respect to output from the legacy software program 202. For example, the system may validate an end-of-day marker API response with a legacy account snapshot for data accuracy. The system may validate the account snapshot after processing transactions. The system may validate in real time with synchronous processing and offline with asynchronous processing. The validation may be configured to be performed daily, monthly, per transaction date, for the current transaction, or another suitable configuration. The system may accordingly detect account mismatches.

At results aggregation component 220, the system may generate a validation summary, including performance metrics, business metrics, etc., in order to provide a streamlined way to see the validation results. For example, the summary may show which accounts mismatched and when, by how much, etc.

The system, based on the comparison, may determine that at least one thread has a mismatch between the dynamic data from the new software program 204 and corresponding dynamic data from the legacy software program 202. The system may generate metadata for the at least one thread to supplement static data for the at least one thread captured from the legacy software program 202. The system may process, using the new software program 204, the supplemented static data for the at least one thread to generate updated dynamic data during the time period subsequent to the particular time associated with the at least one thread. Subsequently, the data validation component 218 and the results aggregation component 220 may again process the updated data for validation and performance results.

In some embodiments, the described systems and methods address a core problem of big snapshot data migration. The described systems and methods may offer specific categorization/segmentation of portfolios of any industrial datasets. The described systems and methods may further offer out of box configuration for segmentation and destinations. Accordingly, when establishing the new software program as the system of record, all historical portfolio data may be migrated from the legacy software program as described herein in order to seamlessly continue servicing future customer portfolios.

In some embodiments, the described systems and methods provide for analyzing performance for different termination time periods for a software program executing one or more threads (e.g., related to one or more auto loans). For example, if an exception (e.g., loan default) occurs for a particular thread of the software program, depending on the selected termination time period (e.g., a repossession period) for the software program, the overall performance (e.g., investment performance) of the software program may be better. Unlike conventional systems, the described systems and methods leverage available past information to make an intelligent selection between different options for the termination time period (e.g., repossession period) for handling an exception (e.g., loan default).

In some embodiments, the system may receive input data and corresponding performance data for multiple threads (e.g., related to multiple auto loans) with respect to a first termination time period (e.g., a first repossession period, such as 90 days) for terminating the thread when an exception (e.g., loan default) is detected. The system may process the input data to generate corresponding performance data (e.g., investment performance) for the multiple threads with respect to a second termination time period (e.g., a second repossession period, such as 60 days) for terminating the thread when the exception is detected. The system may determine a difference in performance for a particular thread, or across multiple threads, based on performance data with respect to the first termination time period and corresponding performance data with respect to the second termination time period. In this way, the system can leverage past information to help choose between different options for the termination time period for future threads (e.g., related to future auto loans) to be executed by the software program.

In some embodiments, to solve modern world numerous policy applications on a frequent basis to complex financial servicing systems, the described systems and methods may be used to drive policies on a complete financial portfolio and get down to impact analysis, prior to real commitment on the policy. By replaying servicing events historically and comparing results, the system may ensure that the new servicing core behavior is accurate. These techniques may be used in conjunction with other testing strategies to establish the new software program as the system of record and may further extend to validating and testing policy decisions in future use cases for the new software program and future iterations of the new software program.

Figure 3:
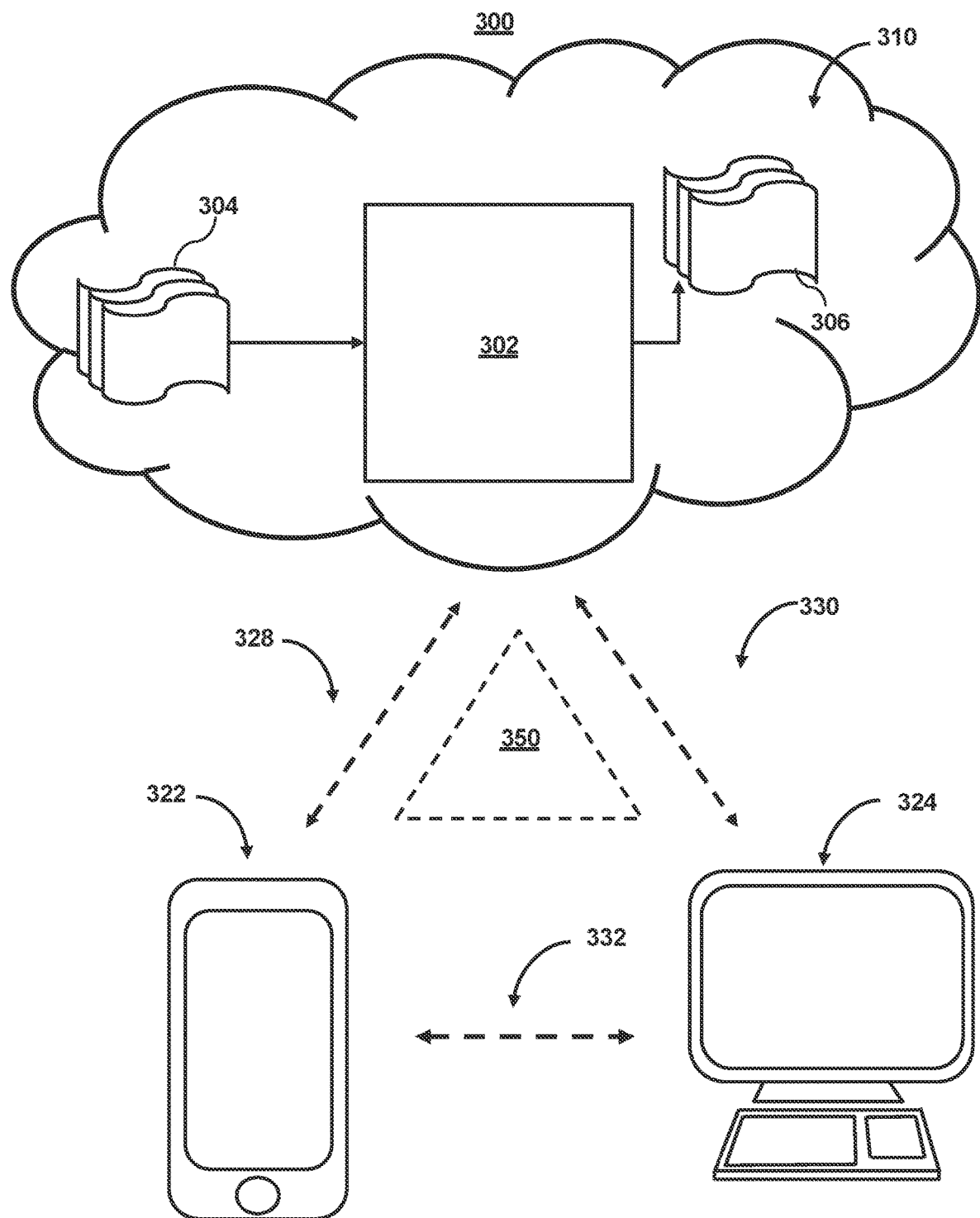
FIG. 3 is an illustrative architecture for a system for facilitating replacement of a legacy software program with a new software program, in accordance with one or more embodiments.

FIG. 3 is an illustrative architecture for a system for facilitating replacement of a legacy software program with a new software program, in accordance with one or more embodiments. As shown in FIG. 3, system 300 may include mobile device 322 and user terminal 324 (either type of device may be a "user device" as referred to herein, though a user device may additionally or alternatively include other types of devices as well). While shown as a smartphone and a personal computer, respectively, in FIG. 3, it should be noted that mobile device 322 and user terminal 324 may be any computing device, including, but not limited to, a laptop computer, a tablet computer, a hand-held computer, or other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users, may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., based on output data received from system 300).

Additionally, as mobile device 322 is shown as a touch-screen smartphone, this display also acts as a user input interface. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic database query responses using ensemble prediction by correlating probability models with non-homogenous time dependencies to generate time-specific data processing predictions.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communication networks or combinations of communication networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include a server 302 for implementing one or more embodiments described with respect to FIGS. 1 and 2. For example, server 302 may implement a legacy software program. Server 302 may receive input data 304 from mobile device 322, execute the legacy software program to process the input data 304, and transmit output data 306 to user terminal 324, or vice versa. In another example, server 302 may or a new software program. Server 302 may receive input data 304 from mobile device 322, execute the new software program to process the input data 304, and transmit output data 306 to user terminal 324, or vice versa. Cloud components 310 may also include control circuitry configured to perform the various operations needed to facilitate replacement of a legacy software program with a new software program, according to one or more embodiments.

In some embodiments, cloud components 310 include an artificial intelligence model. The artificial intelligence model may take inputs and provide outputs. The inputs may include multiple datasets, such as a training dataset and a test dataset. In some embodiments, the outputs may be fed back to the artificial intelligence model as input to train the artificial intelligence model (e.g., alone or in conjunction with user indications of the accuracy of the outputs, with labels associated with the inputs, or with other reference feedback information). For example, the system may receive a first labeled feature input, wherein the first labeled feature input is labeled with a known prediction for the first labeled feature input. The system may then train the artificial intelligence model to classify the first labeled feature input with the known prediction.

In another embodiment, the artificial intelligence model may update its configurations (e.g., weights, biases, or other parameters) based on the assessment of its prediction and reference feedback information (e.g., user indication of accuracy, reference labels, or other information). In another embodiment, where the artificial intelligence model is a neural network, connection weights may be adjusted to reconcile differences between the neural network's prediction and the reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the artificial intelligence model may be trained to generate better predictions.

In some embodiments, the artificial intelligence model may include an artificial neural network. In such embodiments, the artificial intelligence model may include an input layer and one or more hidden layers. Each neural unit of the artificial intelligence model may be connected with many other neural units of the artificial intelligence model. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function that the signal must surpass before it propagates to other neural units. The artificial intelligence model may be self-learning and trained, rather than explicitly programmed, and can perform significantly better in certain areas of problem solving as compared to traditional computer programs. During training, an output layer of the artificial intelligence model may correspond to a classification of the artificial intelligence model, and an input known to correspond to that classification may be input into an input layer of the artificial intelligence model during training. During testing, an input without a known classification may be input into the input layer, and a determined classification may be output.

In some embodiments, the artificial intelligence model may include multiple layers (e.g., where a signal path traverses from front layers to back layers). In some embodiments, backpropagation techniques may be utilized by the artificial intelligence model where forward stimulation is used to reset weights on the "front" neural units. In some embodiments, stimulation and inhibition for the artificial intelligence model may be more free-flowing, with connections interacting in a more chaotic and complex fashion. During testing, an output layer of the artificial intelligence model may indicate whether or not a given input corresponds to a classification of the artificial intelligence model.

System 300 also includes application programming interface (API) layer 350. API layer 350 may allow the system to communicate across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 100 may be partially based on API layer 350, such that there is strong adoption of SOAP and RESTful Web services, using resources like Service Repository and Developer Portal, but with low governance, standardization, and separation of concerns. Alternatively, system 100 may be fully based on API layer 350, such that separation of concerns between layers like API layer 350, services, and applications are in place.

In some embodiments, the system architecture may use a microservice approach. Such systems may use two types of layers: Front-End Layer and Back-End Layer, where microservices reside. In this kind of architecture, the role of the API layer 350 may provide integration between the Front-End Layer and the Back-End Layer. In such cases, API layer 350 may use RESTful APIs (exposition to front-end or event communication between microservices). API layer 350 may use AMQP (e.g., Kafka, RabbitMQ, etc.). API layer 350 may use incipient usage of new communication protocols such as gRPC, Thrift, etc.

In some embodiments, the system architecture may use an open API approach. In such cases, API layer 350 may use commercial or open-source API platforms and their modules. API layer 350 may use a developer portal. API layer 350 may use strong security constraints applying WAF and DDoS protection, and API layer 350 may use RESTful APIs as standard for external integration.

Figure 4:
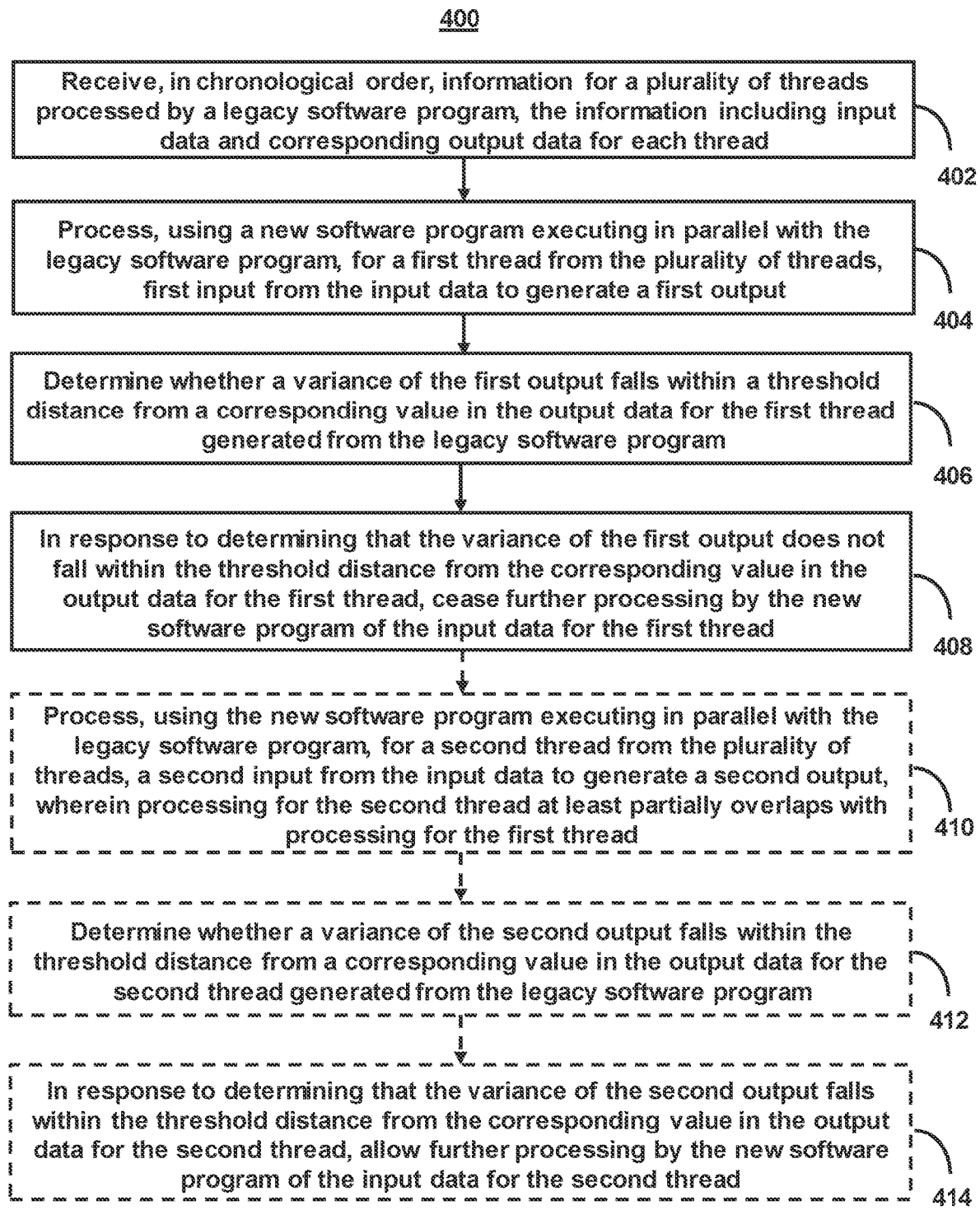
FIG. 4 shows a flowchart of the steps involved in determining that a new software program is in parity with a legacy software program, in accordance with one or more embodiments.

FIG. 4 shows a flowchart of the steps involved in determining that a new software program is in parity with a legacy software program, in accordance with one or more embodiments. For example, process 400 may represent the steps taken by one or more devices as shown in FIGS. 1-3.

At step 402, process 400 (e.g., using one or more components in system 300 (FIG. 3)) receives, in chronological order, information for a plurality of threads processed by a legacy software program. The information may include input data and corresponding output data for each thread. For example, as described with respect to FIG. 1, the system may receive input data 106 for processing by the legacy software program 102 and the new software program 104. The system may also receive legacy output data 108 corresponding to the input data for each thread of the plurality of threads processed by the legacy software program 102.

At step 404, process 400 processes, using a new software program executing in parallel with the legacy software program, for a first thread from the plurality of threads, first input from the input data to generate a first output. For example, as described with respect to FIG. 1, while the new software program 104 is executing in parallel with the legacy software program 102, for a first thread (e.g., related to a first auto loan) from the plurality of threads, the system may process a first input from the input data 106 to generate a first output for the new output data 110 from the new software program 104.

At step 406, process 400 determines whether a variance of the first output falls within a threshold distance from a corresponding value in the output data for the first thread generated from the legacy software program. For example, as described with respect to FIG. 1, the system may determine using a data comparator 116 whether a variance of the first output from the new software program 104 falls within a threshold distance from a corresponding value in the output data for the first thread from the legacy software program 102.

At step 408, process 400, in response to determining that the variance of the first output does not fall within the threshold distance from the corresponding value in the output data for the first thread, ceases further processing by the new software program of the input data for the first thread. For example, as described with respect to FIG. 1, if the variance of the first output from the new output data 110 does not fall within the threshold distance from the corresponding value in the output data from the legacy output data 108, the system may cease further processing by the new software program 104 of the input data for the first thread.

In some embodiments, process 400 may, in response to determining that the variance of the first output does not fall within the threshold distance from the corresponding value in the output data for the first thread, record a state of the new software program at a time prior to processing, for the first thread, the first input to generate the first output. Further, process 400 may, based on a recorded state from the new software program, recreate a state of an updated new software program at the time prior to processing, for the first thread, the first input to generate the first output.

At step 410, process 400 may optionally process, using the new software program executing in parallel with the legacy software program, for a second thread from the plurality of threads, a second input from the input data to generate a second output. In some embodiments, processing for the second thread may at least partially overlap with processing for the first thread. For example, as described with respect to FIG. 1, for a second thread (e.g., related to a second auto loan) from the plurality of threads, the system may process a second input from the input data 106 to generate a second output for the new output data 110 from the new software program 104.

At step 412, process 400 may optionally determine whether a variance of the second output falls within the threshold distance from a corresponding value in the output data for the second thread generated from the legacy software program. For example, as described with respect to FIG. 1, the system may determine using the data comparator 116 whether a variance of the second output from the new software program 104 falls within the threshold distance from a corresponding value in the output data for the second thread from the legacy software program 102.

At step 414, process 400 may optionally, in response to determining that the variance of the second output falls within the threshold distance from the corresponding value in the output data for the second thread, allow further processing by the new software program of the input data for the second thread. For example, as described with respect to FIG. 1, if the variance of the second output from the new output data 110 falls within the threshold distance from the corresponding value in the output data from the legacy output data 108, the system may allow further processing by the new software program 104 of the input data for the second thread.

In some embodiments, process 400 may subsequently process, using an updated new software program, for the first thread, the first input from the input data to generate an updated first output. Process 400 may determine whether a variance of the updated first output falls within the threshold distance from the corresponding value in the output data for the first thread generated from the legacy software program. Process 400 may, in response to determining that the variance of the updated first output falls within the threshold distance from the corresponding value in the output data for the first thread, allow further processing by the updated new software program of the input data for the first thread.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
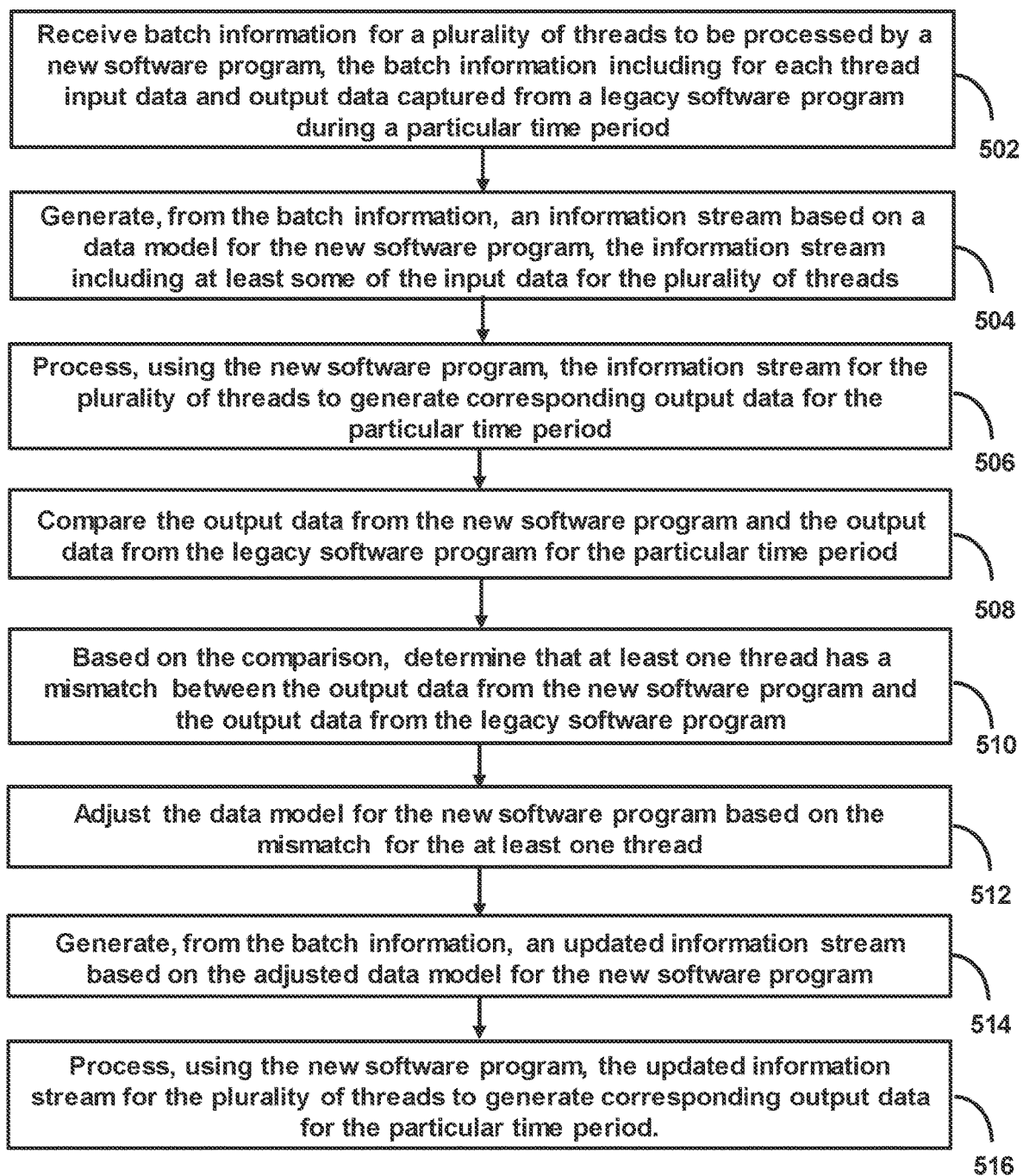
FIG. 5 shows a flowchart of the steps involved in transforming data from a batch-based legacy software program for processing by a streaming-based new software program, in accordance with one or more embodiments.

FIG. 5 shows a flowchart of the steps involved in transforming data from a batch-based legacy software program for processing by a streaming-based new software program, in accordance with one or more embodiments. For example, process 500 may represent the steps taken by one or more devices as shown in FIGS. 1-3.

At step 502, process 500 (e.g., using one or more components in system 300 (FIG. 3)) receives batch information for a plurality of threads to be processed by a new software program. The batch information may include for each thread input data and output data captured from a legacy software program during a particular time period. For example, as described with respect to FIG. 1, the input data 106 received by the system may include batch information for a plurality of threads to be processed by the legacy software program 102. The batch information may include for each thread (e.g., where the thread is related to an auto loan) input data and output data captured from the legacy software program 102 during a particular time period. In some embodiments, at least some of the input data for the plurality of threads for the information stream may include a combination of the input data for the plurality of threads.

At step 504, process 500 generates, from the batch information, an information stream based on a data model for the new software program. The information stream may include at least some of the input data for the plurality of threads. The data model for the new software program may be different from a data model for the legacy software program. The data model for the new software program may include a streaming data model, and the data model for the legacy software program may include a batch processing data model. For example, as described with respect to FIG. 1, because the data model for the new software program 104 is different from a data model for the legacy software program 102, using input abstraction layer 112, the system may generate, from the batch information, an information stream based on a data model for the new software program 104.

At step 506, process 500 processes, using the new software program, the information stream for the plurality of threads to generate corresponding output data for the particular time period. For example, as described with respect to FIG. 1, the system may process, using the new software program 104, the information stream for the plurality of threads to generate corresponding output data for the particular time period. The system may use output abstraction layer 114 to generate batch information (for new output data 110) from the information stream for the corresponding output data from the new software program 104.

At step 508, process 500 compares the output data from the new software program and the output data from the legacy software program for the particular time period. For example, as described with respect to FIG. 1, the system may compare the new output data 110 from the new software program 104 and the legacy output data 108 from the legacy software program 102 for the particular time period.

At step 510, process 500, based on the comparison, determines that at least one thread has a mismatch between the output data from the new software program and the output data from the legacy software program. For example, as described with respect to FIG. 1, the system, based on the comparison, may determine that at least one thread has a mismatch between the new output data 110 from the new software program 104 and the legacy output data 108 from the legacy software program 102.

At step 512, process 500 adjusts the data model for the new software program based on the mismatch for the at least one thread. For example, as described with respect to FIG. 1, the system may adjust the data model for the new software program 104 based on the mismatch for the at least one thread. The system may adjust logic for combining multiple attributes into one attribute, logic for adapting batch-based information for an attribute into stream-based information, etc.

At step 514, process 500 generates, from the batch information, an updated information stream based on the adjusted data model for the new software program. For example, as described with respect to FIG. 1, the system may generate, from the batch information, an updated information stream based on the adjusted data model for the new software program 104.

At step 516, process 500 processes, using the new software program, the updated information stream for the plurality of threads to generate corresponding output data for the particular time period. For example, as described with respect to FIG. 1, the system may process, using the new software program 104, the updated information stream for the plurality of threads to generate the new output data 110 for the particular time period.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

FIG. 6 shows a flowchart of the steps involved in migrating data from a legacy software program to a new software program, in accordance with one or more embodiments. For example, process 600 may represent the steps taken by one or more devices as shown in FIGS. 1-3.

At step 602, process 600 (e.g., using one or more components in system 300 (FIG. 3)) receives information for a plurality of threads to be processed by a new software program. For example, as described with respect to FIG. 2, the system may receive information for a plurality of threads to be processed by the new software program 204 at the cloud component 210. The information may include for each thread static data captured from a legacy software program at a particular time associated with the thread. For example, the static data may include a snapshot of data related to a loan account at a particular time.

At step 604, process 600 processes, using the new software program, the static data for each thread of the plurality of threads to generate corresponding dynamic data during a time period subsequent to the particular time associated with the thread. For example, as described with respect to FIG. 2, the system may process, using the new software program 204, the static data for each thread to generate corresponding dynamic data during a time period subsequent to the particular time associated with the thread.

At step 606, process 600 compares, for each thread of the plurality of threads, the dynamic data from the new software program and corresponding dynamic data during the time period from the legacy software program. For example, as described with respect to FIG. 2, the system may compare, for each thread, the dynamic data from the new software program 204 and corresponding dynamic data during the time period from the legacy software program 202.

At step 608, process 600, based on the comparison, determines that at least one thread has a mismatch between the dynamic data from the new software program and corresponding dynamic data from the legacy software program. For example, as described with respect to FIG. 2, the system, based on the comparison, may determine that at least one thread has a mismatch between the dynamic data from the new software program 204 and corresponding dynamic data from the legacy software program 202.

At step 610, process 600 generates metadata for the at least one thread to supplement static data for the at least one thread captured from the legacy software program. For example, as described with respect to FIG. 2, the system may generate metadata for the at least one thread to supplement static data for the at least one thread captured from the legacy software program 202.

At step 612, process 600 processes, using the new software program, the supplemented static data for the at least one thread to generate updated dynamic data during the time period subsequent to the particular time associated with the at least one thread. For example, as described with respect to FIG. 2, the system may process, using the new software program 204, the supplemented static data for the at least one thread to generate updated dynamic data during the time period subsequent to the particular time associated with the at least one thread.

In some embodiments, process 600 processes, using the new software program, the supplemented static data for the at least one thread to generate updated dynamic data by performing further steps as described below. First, process 600 may process, using the new software program, a portion of the supplemented static data for the at least one thread to generate a portion of the updated dynamic data. Next, process 600 may compare, for the at least one thread, the portion of the updated dynamic data from the new software program and corresponding dynamic data during the time period from the legacy software program. Based on the comparison, process 600 may determine that the portion of the updated dynamic data from the new software program matches the corresponding dynamic data from the legacy software program for the at least one thread. Finally, process 600 may process, using the new software program, a remainder of the supplemented static data for the at least one thread to generate a remainder of the updated dynamic data.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 6.

Figure 7:
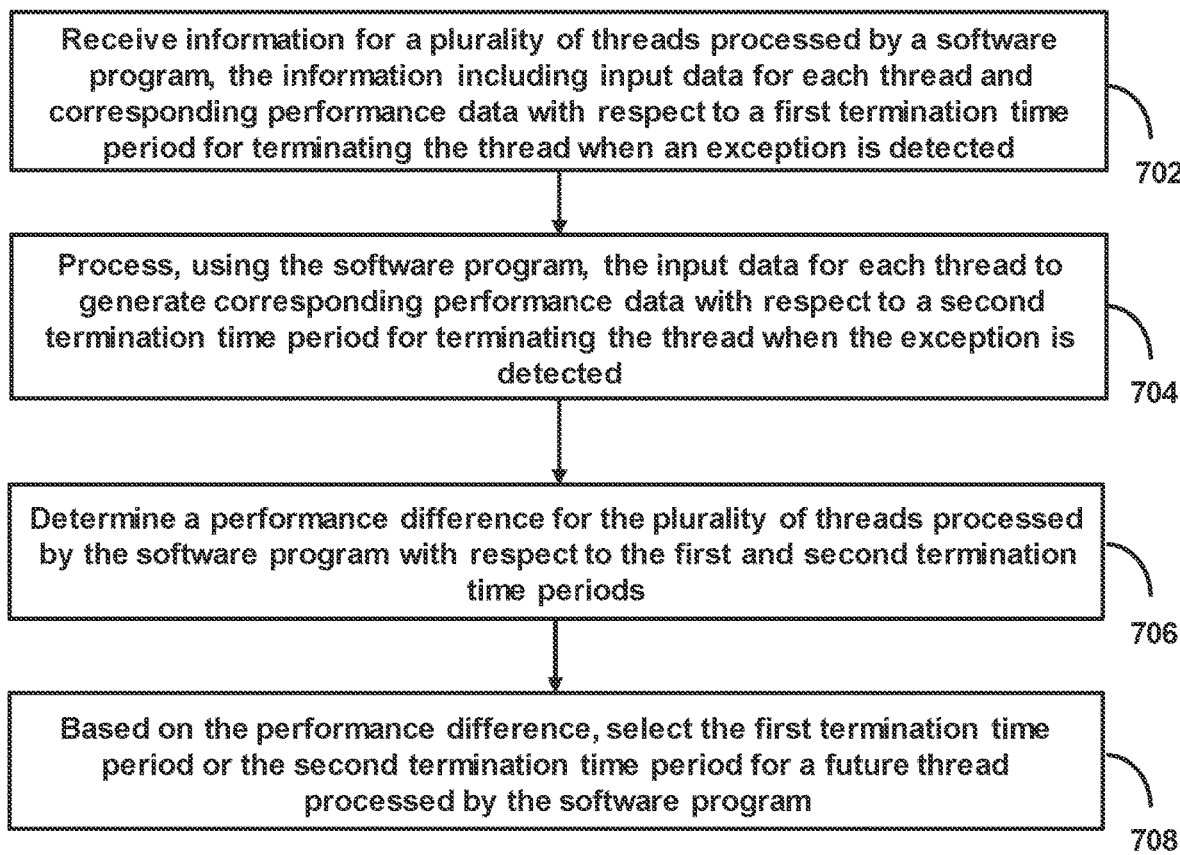
FIG. 7 shows a flowchart of the steps involved in determining a difference in performance for a software program processing input data for a plurality of threads based on different termination time periods for handling an exception, in accordance with one or more embodiments.

FIG. 7 shows a flowchart of the steps involved in determining a difference in performance for a software program processing input data for a plurality of threads based on different termination time periods for handling an exception, in accordance with one or more embodiments. For example, process 700 may represent the steps taken by one or more devices as shown in FIGS. 1-3.

At step 702, process 700 (e.g., using one or more components in system 300 (FIG. 3)) receives information for a plurality of threads processed by a software program. The information may include input data for each thread and corresponding performance data with respect to a first termination time period for terminating the thread when an exception is detected. For example, the system may receive input data and corresponding performance data for multiple threads (e.g., related to multiple auto loans) with respect to a first termination time period (e.g., a first repossession period, such as 90 days) for terminating the thread when an exception (e.g., loan default) is detected. In some embodiments, the input data for each thread may include dynamic data associated with a time period and the corresponding performance data may be associated with the time period. In some embodiments, the input data for each thread may include static data associated with a particular time and the corresponding performance data is associated with the particular time.

At step 704, process 700 processes, using the software program, the input data for each thread to generate corresponding performance data with respect to a second termination time period for terminating the thread when the exception is detected. For example, the system may process the input data to generate corresponding performance data (e.g., investment performance) for the multiple threads with respect to a second termination time period (e.g., a second repossession period, such as 60 days) for terminating the thread when the exception is detected. The processing may include extracting, for a first thread from the plurality of threads, first input from the input data and processing, using the software program, for the first thread, the first input to generate performance data with respect to the second termination time period.

At step 706, process 700 determines a performance difference for the plurality of threads processed by the software program with respect to the first and second termination time periods. For example, the system may determine a difference in performance for a particular thread, or across multiple threads, based on performance data with respect to the first termination time period and corresponding performance data with respect to the second termination time period. The determining may include extracting, for the first thread, performance data with respect to the first termination time period and determining a performance difference for the first thread based on the performance data with respect to the first termination time period and the performance data with respect to the second termination time period.

In some embodiments, process 700 may determine a performance difference for the plurality of threads processed by the software program with respect to the first and second termination time periods by determining a first mean, a first median, or a first mode based on performance data for the plurality of threads with respect to the first termination time period, determining a second mean, a second median, or a second mode based on performance data for the plurality of threads with respect to the second termination time period, and determining the performance difference for the plurality of threads with respect to the first and second termination time periods based on the first mean, the first median, or the first mode and the second mean, the second median, or the second mode.

At step 708, process 700 may, based on the performance difference, select the first termination time period or the second termination time period for a future thread processed by the software program.

In some embodiments, process 700 may select the first termination time period or the second termination time period for the software program based on the performance difference by determining a first minimum based on performance data for the plurality of threads with respect to the first termination time period, determining a second minimum based on performance data for the plurality of threads with respect to the first termination time period, and determining the performance difference for the plurality of threads with respect to the first and second termination time periods based on the first minimum and the second minimum.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for determining software parity will be better understood with reference to the following enumerated embodiments:

1. A method comprising: receiving, in chronological order, information for a plurality of threads processed by a legacy software program, the information including input data and corresponding output data for each thread; processing, using a new software program executing in parallel with the legacy software program, for a first thread from the plurality of threads, first input from the input data to generate a first output; determining whether a variance of the first output falls within a threshold distance from a corresponding value in the output data for the first thread generated from the legacy software program; in response to determining that the variance of the first output does not fall within the threshold distance from the corresponding value in the output data for the first thread, ceasing further processing by the new software program of the input data for the first thread; processing, using the new software program executing in parallel with the legacy software program, for a second thread from the plurality of threads, a second input from the input data to generate a second output, wherein processing for the second thread at least partially overlaps with processing for the first thread; determining whether a variance of the second output falls within the threshold distance from a corresponding value in the output data for the second thread generated from the legacy software program; and in response to determining that the variance of the second output falls within the threshold distance from the corresponding value in the output data for the second thread, allowing further processing by the new software program of the input data for the second thread.

2. A method comprising: receiving information for a plurality of threads processed by a legacy software program, the information including input data and corresponding output data for each thread; processing, using a new software program, for a first thread from the plurality of threads, first input from the input data to generate a first output; determining whether a variance of the first output falls within a threshold distance from a corresponding value in the output data for the first thread generated from the legacy software program; and in response to determining that the variance of the first output does not fall within the threshold distance from the corresponding value in the output data for the first thread, ceasing further processing by the new software program of the input data for the first thread.

3. The method of any one of the preceding embodiments, wherein receiving information for the plurality of threads processed by the legacy software program comprises receiving the information for the plurality of threads processed by the legacy software program in chronological order.

4. The method of any one of the preceding embodiments, wherein the new software program is executed in parallel with the legacy software program.

5. The method of any one of the preceding embodiments, further comprising: processing, using the new software program executing in parallel with the legacy software program, for a second thread from the plurality of threads, a second input from the input data to generate a second output, wherein processing for the second thread at least partially overlaps with processing for the first thread; determining whether a variance of the second output falls within the threshold distance from a corresponding value in the output data for the second thread generated from the legacy software program; and in response to determining that the variance of the second output falls within the threshold distance from the corresponding value in the output data for the second thread, allowing further processing by the new software program of the input data for the second thread.

6. The method of any one of the preceding embodiments, further comprising: in response to determining that the variance of the first output does not fall within the threshold distance from the corresponding value in the output data for the first thread, recording a state of the new software program at a time prior to processing, for the first thread, the first input to generate the first output.

7. The method of any one of the preceding embodiments, further comprising: based on a recorded state from the new software program, recreating a state of an updated new software program at a time prior to processing, for the first thread, the first input to generate the first output.

8. The method of any one of the preceding embodiments, further comprising: processing, using an updated new software program, for the first thread, the first input from the input data to generate an updated first output; determining whether a variance of the updated first output falls within the threshold distance from the corresponding value in the output data for the first thread generated from the legacy software program; and in response to determining that the variance of the updated first output falls within the threshold distance from the corresponding value in the output data for the first thread, allowing further processing by the updated new software program of the input data for the first thread.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

The present techniques for data transformation will be better understood with reference to the following enumerated embodiments:

1. A method comprising: receiving batch information for a plurality of threads to be processed by a new software program, the batch information including for each thread input data and output data captured from a legacy software program during a particular time period; generating, from the batch information, an information stream based on a data model for the new software program, the information stream including at least some of the input data for the plurality of threads, the data model for the new software program being different from a data model for the legacy software program; processing, using the new software program, the information stream for the plurality of threads to generate corresponding output data for the particular time period; comparing the output data from the new software program and the output data from the legacy software program for the particular time period; based on the comparison, determining that at least one thread has a mismatch between the output data from the new software program and the output data from the legacy software program; adjusting the data model for the new software program based on the mismatch for the at least one thread; generating, from the batch information, an updated information stream based on the adjusted data model for the new software program; and processing, using the new software program, the updated information stream for the plurality of threads to generate corresponding output data for the particular time period.

2. A method comprising: receiving batch information for a plurality of threads to be processed by a new software program, the batch information including for each thread input data and output data captured from a legacy software program during a particular time period; generating, from the batch information, an information stream based on a data model for the new software program, the information stream including at least some of the input data for the plurality of threads; processing, using the new software program, the information stream for the plurality of threads to generate corresponding output data for the particular time period; and based on determining that at least one thread has a mismatch between the output data from the new software program and the output data from the legacy software program, adjusting the data model for the new software program based on the mismatch for the at least one thread.
3. The method of any one of the preceding embodiments, wherein the at least some of the input data for the plurality of threads for the information stream includes a combination of the input data for the plurality of threads.
4. The method of any one of the preceding embodiments, wherein the data model for the new software program is different from a data model for the legacy software program.
5. The method of any one of the preceding embodiments, wherein the data model for the new software program includes a streaming data model, and wherein the data model for the legacy software program includes a batch processing data model.
6. The method of any one of the preceding embodiments, further comprising: comparing the output data from the new software program and the output data from the legacy software program for the particular time period; and based on the comparison, determining that at least one thread has a mismatch between the output data from the new software program and the output data from the legacy software program.
7. The method of any one of the preceding embodiments, further comprising: generating, from the batch information, an updated information stream based on the adjusted data model for the new software program; and processing, using the new software program, the updated information stream for the plurality of threads to generate corresponding output data for the particular time period.
8. A tangible, non-transitory, machine-readable medium storing instructions that, when executed by a data processing apparatus, cause the data processing apparatus to perform operations comprising those of any of embodiments 1-7.
9. A system comprising: one or more processors; and memory storing instructions that, when executed by the processors, cause the processors to effectuate operations comprising those of any of embodiments 1-7.
10. A system comprising means for performing any of embodiments 1-7.

The present techniques for data migration will be better understood with reference to the following enumerated embodiments:

1. A method comprising: receiving information for a plurality of threads to be processed by a new software program, the information including for each thread static data captured from a legacy software program at a particular time associated with the thread; processing, using the new software program, the static data for each thread of the plurality of threads to generate corresponding dynamic data during a time period subsequent to the particular time associated with the thread; comparing, for each thread of the plurality of threads, the dynamic data from the new software program and corresponding dynamic data during the time period from the legacy software program; based on the comparison, determining that at least one thread has a mismatch between the dynamic data from the new software program and corresponding dynamic data from the legacy software program; generating metadata for the at least one thread to supplement static data for the at least one thread captured from the legacy software program; and processing, using the new software program, the supplemented static data for the at least one thread to generate updated dynamic data during the time period subsequent to the particular time associated with the at least one thread.
2. A method comprising: receiving information for a plurality of threads to be processed by a new software program, the information including for each thread static data associated with the thread; processing, using the new software program, the static data for each thread of the plurality of threads to generate corresponding dynamic data associated with the thread; and based on determining that at least one thread has a mismatch between the dynamic data from the new software program and corresponding dynamic data from a legacy software program, processing, using the new software program, supplemented static data for the at least one thread to generate updated dynamic data during a time period subsequent to the particular time associated with the at least one thread.
3. The method of any one of the preceding embodiments, further comprising: comparing, for each thread of the plurality of threads, the dynamic data from the new software program and corresponding dynamic data during the time period from the legacy software program; and based on the comparison, determining that at least one thread has a mismatch between the dynamic data from the new software program and corresponding dynamic data from the legacy software program.
4. The method of any one of the preceding embodiments, further comprising: generating metadata for the at least one thread to supplement static data for the at least one thread captured from the legacy software program.
5. The method of any one of the preceding embodiments, wherein the static data for each thread is captured from the legacy software program at a particular time associated with the thread.
6. The method of any one of the preceding embodiments, wherein the static data for each thread is processed to generate corresponding dynamic data during a time period subsequent to the particular time associated with the thread.
7. The method of any one of the preceding embodiments, wherein processing, using the new software program, the supplemented static data for the at least one thread to generate updated dynamic data comprises: processing, using the new software program, a portion of the supplemented static data for the at least one thread to generate a portion of the updated dynamic data; comparing, for the at least one thread, the portion of the updated dynamic data from the new software program and corresponding dynamic data during the time period from the legacy software program.
8. The method of any one of the preceding embodiments, wherein processing, using the new software program, the supplemented static data for the at least one thread to generate updated dynamic data comprises: based on the comparison, determining that the portion of the updated dynamic data from the new software program matches the corresponding dynamic data from the legacy software program for the at least one thread; and processing, using the new software program, a remainder of the supplemented static data for the at least one thread to generate a remainder of the updated dynamic data.
9. A tangible, non-transitory, machine-readable medium storing instructions that, when executed by a data processing apparatus, cause the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.
11. A system comprising means for performing any of embodiments 1-8.

The present techniques for analyzing performance for different termination time periods will be better understood with reference to the following enumerated embodiments:

1. A method comprising: receiving information for a plurality of threads processed by a software program, the information including input data for each thread and corresponding performance data with respect to a first termination time period for terminating the thread when an exception is detected; processing, using the software program, the input data for each thread to generate corresponding performance data with respect to a second termination time period for terminating the thread when the exception is detected, the processing including: extracting, for a first thread from the plurality of threads, first input from the input data; and processing, using the software program, for the first thread, the first input to generate performance data with respect to the second termination time period; determining a performance difference for the plurality of threads processed by the software program with respect to the first and second termination time periods, including: extracting, for the first thread, performance data with respect to the first termination time period; and determining a performance difference for the first thread based on the performance data with respect to the first termination time period and the performance data with respect to the second termination time period; and based on the performance difference, selecting the first termination time period or the second termination time period for a future thread processed by the software program.
2. A method comprising: receiving information for a plurality of threads processed by a software program, the information including input data for each thread and corresponding performance data with respect to a first termination time period for terminating the thread when an exception is detected; processing, using the software program, the input data for each thread to generate corresponding performance data with respect to a second termination time period for terminating the thread when the exception is detected; determining a performance difference for the plurality of threads processed by the software program with respect to the first and second termination time periods; and based on the performance difference, selecting the first termination time period or the second termination time period for a future thread processed by the software program.
3. The method of any one of the preceding embodiments, wherein processing, using the software program, the input data for each thread to generate corresponding performance data with respect to a second termination time period for terminating the thread when the exception is detected includes: extracting, for a first thread from the plurality of threads, first input from the input data; and processing, using the software program, for the first thread, the first input to generate performance data with respect to the second termination time period.
4. The method of any one of the preceding embodiments, wherein determining a performance difference for the plurality of threads processed by the software program with respect to the first and second termination time periods includes: extracting, for the first thread, performance data with respect to the first termination time period; and determining a performance difference for the first thread based on the performance data with respect to the first termination time period and the performance data with respect to the second termination time period.
5. The method of any one of the preceding embodiments, wherein determining a performance difference for the plurality of threads processed by the software program with respect to the first and second termination time periods comprises: determining a first mean, a first median, or a first mode based on performance data for the plurality of threads with respect to the first termination time period; determining a second mean, a second median, or a second mode based on performance data for the plurality of threads with respect to the second termination time period; and determining the performance difference for the plurality of threads with respect to the first and second termination time periods based on: the first mean, the first median, or the first mode; and the second mean, the second median, or the second mode.
6. The method of any one of the preceding embodiments, wherein selecting the first termination time period or the second termination time period for the software program based on the performance difference comprises: determining a first minimum based on performance data for the plurality of threads with respect to the first termination time period; determining a second minimum based on performance data for the plurality of threads with respect to the first termination time period; and determining the performance difference for the plurality of threads with respect to the first and second termination time periods based on the first minimum and the second minimum.
7. The method of any one of the preceding embodiments, wherein the input data for each thread includes dynamic data associated with a time period and the corresponding performance data is associated with the time period.
8. The method of any one of the preceding embodiments, wherein the input data for each thread includes static data associated with a particular time and the corresponding performance data is associated with the particular time.
9. A tangible, non-transitory, machine-readable medium storing instructions that, when executed by a data processing apparatus, cause the data processing apparatus to perform operations comprising those of any of embodiments 1-8.
10. A system comprising: one or more processors; and memory storing instructions that, when executed by the processors, cause the processors to effectuate operations comprising those of any of embodiments 1-8.
11. A system comprising means for performing any of embodiments 1-8.

What is claimed is:

1. A system for transforming data from a batch-based legacy software program for processing by a streaming-based new software program, the system comprising:
one or more processors; and
a non-transitory, computer-readable medium comprising instructions that, when executed by the one or more processors, cause operations comprising:
receiving batch information for a plurality of threads to be processed by a new software program, the batch information including for each thread input data and output data captured from a legacy software program during a particular time period;
generating, from the batch information, an information stream based on a data model for the new software program, the information stream including at least some of the input data for the plurality of threads, the data model for the new software program being different from a data model for the legacy software program;
processing, using the new software program, the information stream for the plurality of threads to generate corresponding output data for the particular time period;
comparing the output data from the new software program and the output data from the legacy software program for the particular time period;
based on the comparison, determining that at least one thread has a mismatch between the output data from the new software program and the output data from the legacy software program;
adjusting the data model for the new software program based on the mismatch for the at least one thread;
generating, from the batch information, an updated information stream based on the adjusted data model for the new software program; and
processing, using the new software program, the updated information stream for the plurality of threads to generate corresponding output data for the particular time period.

2. The system of claim 1, wherein the data model for the new software program includes a streaming data model, and wherein the data model for the legacy software program includes a batch processing data model.

3. The system of claim 1, wherein the at least some of the input data for the plurality of threads for the information stream includes a combination of the input data for the plurality of threads.

4. A method comprising:
receiving batch information for a plurality of threads to be processed by a new software program, the batch information including for each thread input data and output data captured from a legacy software program during a particular time period;
generating, from the batch information, an information stream based on a data model for the new software program, the information stream including at least some of the input data for the plurality of threads;
processing, using the new software program, the information stream for the plurality of threads to generate corresponding output data for the particular time period; and
based on determining that at least one thread has a mismatch between the output data from the new software program and the output data from the legacy software program, adjusting the data model for the new software program based on the mismatch for the at least one thread.

5. The method of claim 4, wherein the at least some of the input data for the plurality of threads for the information stream includes a combination of the input data for the plurality of threads.

6. The method of claim 4, wherein the data model for the new software program is different from a data model for the legacy software program.

7. The method of claim 6, wherein the data model for the new software program includes a streaming data model, and wherein the data model for the legacy software program includes a batch processing data model.

8. The method of claim 4, further comprising:
comparing the output data from the new software program and the output data from the legacy software program for the particular time period; and
based on the comparison, determining that at least one thread has a mismatch between the output data from the new software program and the output data from the legacy software program.

9. The method of claim 4, further comprising:
generating, from the batch information, an updated information stream based on the adjusted data model for the new software program; and
processing, using the new software program, the updated information stream for the plurality of threads to generate corresponding output data for the particular time period.

10. A non-transitory, computer-readable medium comprising instructions that, when executed by one or more processors, cause operations comprising:
receiving batch information for a plurality of threads to be processed by a new software program, the batch information including for each thread input data and output data captured from a legacy software program during a particular time period;
generating, from the batch information, an information stream based on a data model for the new software program, the information stream including at least some of the input data for the plurality of threads;
processing, using the new software program, the information stream for the plurality of threads to generate corresponding output data for the particular time period; and
based on determining that at least one thread has a mismatch between the output data from the new software program and the output data from the legacy software program, adjusting the data model for the new software program based on the mismatch for the at least one thread.

11. The non-transitory, computer-readable medium of claim 10, wherein the at least some of the input data for the plurality of threads for the information stream includes a combination of the input data for the plurality of threads.

12. The non-transitory, computer-readable medium of claim 10, wherein the data model for the new software program is different from a data model for the legacy software program.

13. The non-transitory, computer-readable medium of claim 12, wherein the data model for the new software program includes a streaming data model, and wherein the data model for the legacy software program includes a batch processing data model.

14. The non-transitory, computer-readable medium of claim 10, further comprising:

comparing the output data from the new software program and the output data from the legacy software program for the particular time period; and based on the comparison, determining that at least one thread has a mismatch between the output data from the new software program and the output data from the legacy software program.

15. The non-transitory, computer-readable medium of claim 10, further comprising:

generating, from the batch information, an updated information stream based on the adjusted data model for the new software program; and processing, using the new software program, the updated information stream for the plurality of threads to generate corresponding output data for the particular time period.

* * * * *